Nov. 3, 1970  R. PROCACINO  3,538,293
APPARATUS FOR WELDING CONDUCTORS SEPARATED
BY THERMOPLASTIC INSULATION
Original Filed Sept. 28, 1966  2 Sheets-Sheet 1
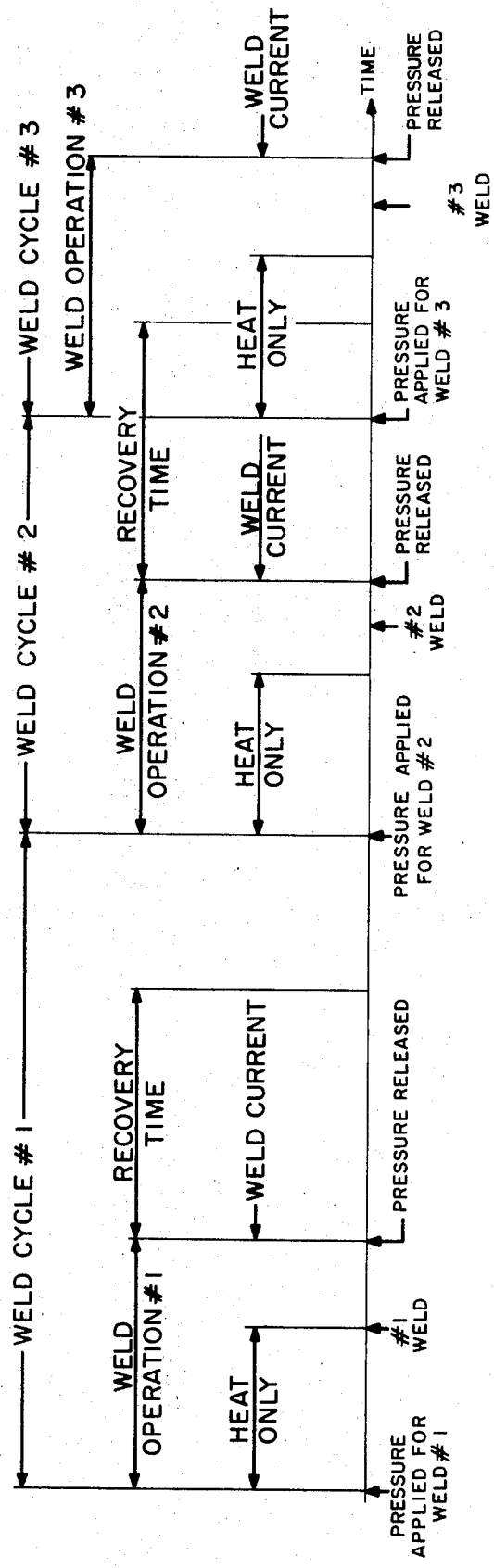
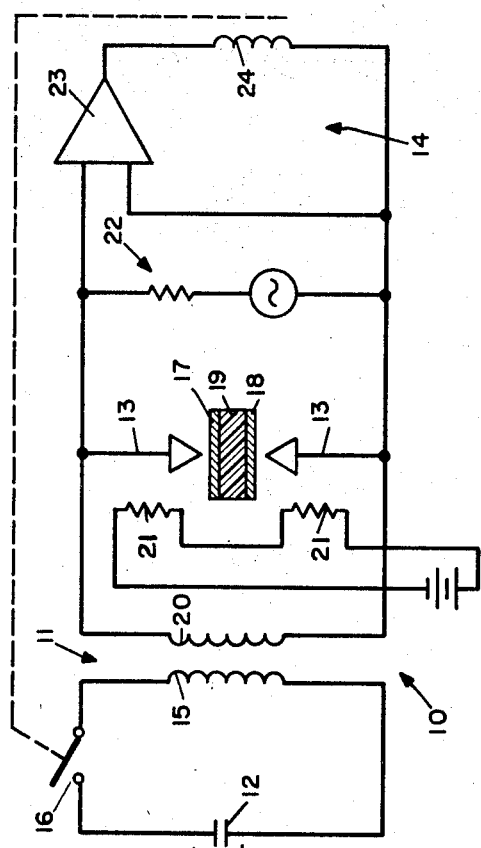
INVENTOR.
ROBERT PROCACINO
BY Donald M. Sandler
ATTORNEY.

INVENTOR.
ROBERT PROCACINO

BY Donald M. Sandler

ATTORNEY.

3,538,293
APPARATUS FOR WELDING CONDUCTORS SEPARATED BY THERMOPLASTIC INSULATION

Robert Procacino, Haddon Heights, N.J., assignor to Elco Corporation, Willow Grove, Pa., a corporation of Delaware
Continuation of application Ser. No. 582,631, Sept. 28, 1966. This application Dec. 10, 1968, Ser. No. 785,037
Int. Cl. B23k 9/10
U.S. Cl. 219—86                              5 Claims

ABSTRACT OF THE DISCLOSURE

In apparatus for welding together a pair of conductors separated by thermoplastic insulation, welding control means is provided which senses the impedance level between the conductors and, when the level reaches a predetermined value, causes an amplifier to change state and drive a relay that causes the flow of welding current to commence.

---

This application is a continuation of Ser. No. 582,631, filed Sept. 28, 1966.

This invention relates to apparatus for welding together a pair of conductors separated by thermoplastic insulation.

Prior apparatus for welding conductors separated by thermoplastic insulation shown, for example in Pats. Nos. 3,418,444 and 3,155,809, achieves welds in a two stage operation as pressure is applied to the welding electrodes: in the first, or heating-only stage, heat is applied to the electrodes when they engage the conductors which, in turn, conduct the heat to the thermoplastic insulation, thereby softening the same in a local region between the conductors and permitting the conductors to penetrate into the softened insulation under the pressure of the welding electrodes; and in the second, or weld stage, welding current is applied to the electrodes when the conductors are in electrical engagement thus achieving the desired welded junction. The above described two-stage weld operation may be used to weld two conductors when each is embedded in thermoplastic insulation, or when only one conductor is embedded in thermoplastic insulation. The former case is representative of splicing the conductors matixed in one piece of ribbon cable to the conductors in another like piece of ribbon cable; while the latter case is representative of welding a terminal contact to an insulated wire. In either case, the heated electrodes must cause the insulation between the conductors to soften, although in the case of splicing, the heated electrodes first engage the insulation and melt through it into engagement with the conductors; and in the case of terminal contact welds, one electrode immediately engages one of the conductors (namely, the terminal contact) as the other electrode melts through the insulation surrounding the other electrode melts through the insulation surrounding the other conductor and eventually electrically engages the same. In both cases, however, the final result is as originally described, namely the softening of the insulation between a pair of conductors.

One of the requirements for the successful operation of apparatus of the type described is the selection of the instant at which welding current is to be supplied to the heated electrodes. If reliance is placed upon the electrical engagement between the electrodes and the respective conductors, or between the conductors themselves, to close a circuit that permits welding current to flow, it has been found that poor welds are achieved, probably due to arcing caused by residual insulation remaining between the conductors. A successful approach to solving this problem lies in experimentally correlating electrode pressure and the duration of the heat-only stage with weld strength to establish the values of these parameters that achieve welds of the highest strength. While there are problems with this approach, it has been successfully used to produce welds of acceptable degrees of strength and repeatability.

Because a heat-only stage of fixed duration is contemplated, this approach to welding conductors separated by thermoplastic insulation requires close control over electrode temperature in order to insure that the same amount of heat will be transferred from the electrodes to the thermoplastic insulation during each heat-only period of successive welds. Any significant variation in electrode temperatures from one heat-only period to the next may result in either excessive removal of insulation in a region surrounding the electrodes when they are hotter than they should be, or a failure to remove sufficient insulation between the conductors when the electrodes are too cool, thereby producing a low strength weld. By proper electrode design and the use of thermocouple controlled heaters, successful operation can be achieved. The most significant problem with the last described arrangement lies in the fixed recovery time of the electrodes. Upon completion of a weld, the electrodes must recover their original pre-heat-only stage temperature if a subsequently performed weld is to be successful. Any attempt to produce a succession of welds where the time interval between completion of one weld and the beginning of the next weld is less than the recovery time of the electrodes, must necessarily produce progressively poorer welds. The cause of this, of course, is the combination of the finite recovery time of the electrodes coupled with the fixed duration heat-only stage. This operation could be significantly improved if the duration of the heat-only stage were made dependent upon the condition of the electrical contact between the electrodes and the respective conductors and between the conductors themselves. Then, the start of another weld could commence immediately after the completion of the preceeding weld with the assurance that weld-current will flow only after a heat-only stage of the proper duration to achieve a strong weld. It is the design of apparatus to make the duration of the heat-only stage functionally related to the electrical condition of the conductors just prior to the flow of weld-current, that constitutes the primary object of the present invention. Apparatus of the type described when so designed has the added advantage of being suitable for welding different types of materials in successive operations without significant manual modifications to the weld cycle.

Briefly, the present invention contemplates using, in the weld-current circuit, a normally-closed relay held open as long as a signal of predetermined strength is applied to an amplifier driven from a signal source that is shunted by the electrodes. When the electrical nature of the electrodes and conductor are such that a strong weld will be achieved, the signal at the input to the amplifier drops below its predetermined strength, the amplifier becomes inoperative, and the relay is actuated to cause welding current to flow.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

In the accompanying drawings:

FIG. 1 is a time-sequence plot showing the sequence of operations required to effect a series of welds;

FIG. 2 is a block diagram schematic representation of the invention applied to a two stage welder;

Figure 3:
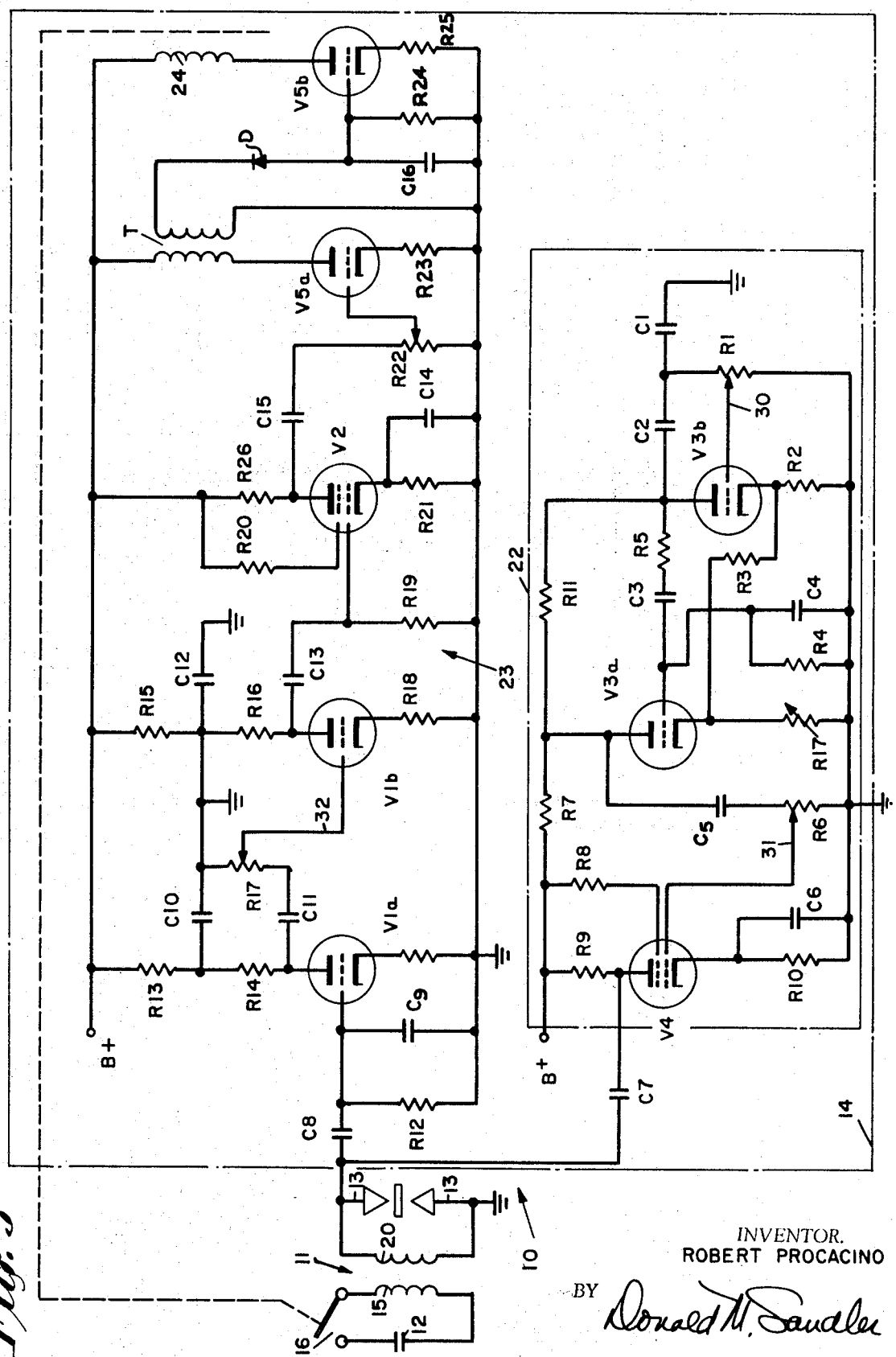
FIG. 3 is a wiring diagram of the welding control means actually constructed and tested.

Before describing the schematic circuit arrangement by which the primary object of the present invention is achieved, reference is made to FIG. 1 which illustrates the limitations of apparatus of the type described, when it is used with a fixed heat-only cycle. As can be seen from inspection, the second weld cycle starts after the welding electrodes have recovered from the first weld operation. Thus, the first and second welds are likely to be successful. The third weld, however, is not likely to be successful because the third weld cycle began during the recovery time of the electrodes. Thus, the amount of heat that the electrodes are able to transfer to the thermoplastic insulation during the heat-only cycle is less than that required to effect sufficient penetration of the conductors into the softened insulation. At the end of the fixed heat-only cycle, when welding current is supplied, the conductors are not in proper electrical engagement with the result that the third weld is likely to be of poor quality.

The present invention overcomes the difficulty with the prior art device, because the heat-only cycle is made variable. The end of such cycle occurs whenever the electrodes have made good electrical contact with the conductors, and the conductors have made good electrical contact with themselves. FIG. 2, to which reference is now made, illustrates in schematic form, a conventional welder into which the present invention is incorporated. Welder 10 comprises welding transformer 11, power source 12, and heated electrodes 13, all of which are essentially conventional, and welding control means 14 that constitutes the structure of the present invention. Power source 12, shown schematically as a charged capacitor is connected across the primary 15 of transformer 11 through a switch in the form of normally closed relay contacts 16 which are held open by the welding control means 14 until electrodes 13 electrically engage conductors 17 and 18 separated by thermoplastic insulation 19, and until conductors 17 and 18 electrically engage each other. At such time, welding control means 14 is no longer capable of holding open contacts 16, and they close causing the charged capacitor to discharge through the primary of the transformer. The secondary 20 of transformer 11 has only a few turns and the surge of current in the primary 15 is transformed into a large current of low voltage that operates as the welding current.

Electrodes 13 are manually or automatically movable in a conventional manner (not shown), into engagement with conductors 17 and 18 to apply pressure to the latter and cause the conductors to penetrate into the softened thermoplastic insulation 19 during the heat-only stage of the welding cycle. The electrodes are heated, preferably, by thermocouple controlled heating elements embedded in the electrodes and illustrated schematically at 21.

To sense the position of the conductors 17 and 18 relative to each other, welding control means 14 is used, and as shown in FIG. 2, such means comprises signal generator 22, amplifier 23, and relay coil 24. As will be described, the welding control means actually is responsive to the electrical engagement of the conductors 17 and 18 for causing welding current to pass through the electrodes and conductors thereby welding the latter together.

Signal generator 22 is connected in parallel with secondary 20 of the welding transformer, the electrodes 13, and the input circuit to amplifier 23 whose output supplies current to operate relay coil 24. Thus, as long as signal of predetermined strength appears at the input of amplifier 23, the latter will furnish driving current to relay coil 24 which in turn will hold contact 16 in their open position. When, however, the pressure on electrodes 13 squeezes conductors 17 and 18 through the softened thermoplastic insulation and into electrical engagement, signal generator 22 is essentially shunted by a very low resistance path comprising the electrodes 13 and conductors 17 and 18, and the signal level at the input to amplifier 23 drops below its predetermined level depriving relay coil 24 of sufficient current to maintain contacts 16 in their open position. At such time, the contacts close, the power source 12 discharges into the primary of the transformer, and welding current flows in the secondary.

It should be noted that the duration of the heat-only cycle depends upon how long it takes for the conductors to be squeezed into electrical engagement, and hence the present invention, in effect, incorporates the recovery time of the electrodes into the heat-only cycle. In other words, the weld operation takes as long as is necessary to achieve good electrical contact between the electrodes and the conductors, and between the conductors themselves. In the present context, "good electrical contact" means contact that is sufficient to reduce the output of amplifier 23 to a level below which it is incapable of furnishing sufficient current to relay coil 24 to result in contacts 16 remaining open. The gain of amplifier 23 can be adjusted to provide a precise selection of the quality of the electrical contact between the various elements such that consistently good welds can be achieved in succession without regard to the recovery time of the electrodes.

Details of signal generator 22 and amplifier 24 are shown in FIG. 3, to which reference is now made. Recalling that the secondary 20 of the welding transformer is shunted by the parallel combination of electrodes 13, signal generator 22 and the input to amplifier 23, and that such secondary is constituted by a low resistance to produce the large welding currents necessary for proper operation, it will be appreciated that a D.C. signal source will develop very little voltage at the input to the amplifier. To overcome this, the present invention contemplates an A.C. signal source whose frequency is selected such that the reactance of secondary 20 of the welding transformer dominates its impedance and permits the signal generator to develop a signal of practical value at the input to the amplifier. In particular, the amplifier 23 can be designed to furnish operating current to relay coil 24 (e.g., current sufficient to maintain contacts 16 in their open state) whenever the input to the amplifier exceeds a predetermined level. The output of signal generator 22 can be made to exceed such level by suitably adjusting the frequency of the signal generator.

The specific construction shown in FIG. 3 and described below is but a single approach to a welding control means that comprises a signal generator driving an amplifier that, in turn, drives a relay. Those skilled in the art will appreciate that other approaches, using this basic concept, could be utilized as well. Tubes V3a and V3b represent the active components of a free running multi-vibrator whose frequency can be controlled by the adjustment of potentiometer 30. The output of the multi-vibrator is taken at the plate of V3a and applied to the control grid of amplifier tube V4, the gain being selected by potentiometer 31. Thus, the multi-vibrator/amplifier arrangement constitutes the signal generator 22, and such arrangement permits selection of the frequency and the no load amplitude of the signal developed at the plate of tube V4.

As indicated previously, the output of the signal generator is applied in shunt to the secondary 20, electrodes 13 and amplifier 23. Specifically, the plate of tube V4 is A.C. coupled to the control grid of preamplifier tube V1a, as well as to secondary 20 and electrodes 13. Further amplification is effected by amplifier tube V1b using R/C coupling between the stages, the gain being controlled by potentiometer 32. The amplified signal appearing at the plate of tube V1b is R/C coupled to the control grid of amplifier tube V2 that drives amplifier tube V5a. The latter is transformer coupled to a rectifier circuit comprising a diode D and capacitor C16 and resistor R24 so that a control signal appears at the grid of output tube V5b. Relay coil 24 is in the output circuit of tube V5b and as a consequence, operating current flows in relay coil 24 as long as the signal level at the control grid of tube V1a exceeds a threshold value determined by manual adjustments to the various potentiometers in the composite amplifier 23.

The component values of an actual device built and operated successfully are shown in the following chart.

| Element: | Value (in ohms if resistance, and in farads if in capacitance) |
|---|---|
| R1 | 1.5M potentiometer. |
| R2 | 2.2K. |
| R3 | Non-linear resistor (lamp bulb). |
| R4, R5 | 500K. |
| R6 | 0–500K potentiometer. |
| R7 | 4800 (5 watts). |
| R8, R20 | 3300. |
| R9 | 10K (2 watts). |
| R10, R21 | 470. |
| R11 | 33K. |
| R12 | 2.2M. |
| R13, R16 | 47K. |
| R14, R19 | 100K. |
| R15 | 10K. |
| R17 | 150 or 1.5K (selectable). |
| R18 | 1500K. |
| R22 | 1M potentiometer. |
| R23 | 1.5K. |
| R24 | 1.5M. |
| R25 | 2.7K. |
| T | A53–C. |
| V1a, b | 12AX7. |
| V2 | 6L6. |
| V3a, b | 12AU7. |
| V4 | 6K6. |
| V5a, b | 12AU7. |
| C1 | 270 pf. |
| C2 | 0.1 mf. |
| C3, C4 | 300 pf. |
| C5, C10, C13, C15, C16 | 0.01 mf. |
| C6, C14 | 10 pf. (25 v.). |
| C7 | 0.05 mf. (600 v.). |
| C8 | 0.01 mf. (600 v.). |
| C9 | 100 pf. |
| C11, C12 | 8 pf. (450 v.). |
| 11 | Weldteck power supply. |
| 24 | Relay, Potter Brumfield #KRP11AG (115 v.). |
| D | Diode 1N34A. |

What is claimed is:

1. Apparatus for welding together a pair of conductors separated by thermoplastic insulation comprising:
   (a) a pair of welding electrodes movable relatively toward each other and adapted, when pressure is applied to said electrodes, to electrically contact said pair of conductors and urge them into electrical engagement;
   (b) means to heat said electrodes while pressure is applied thereto for causing heat from said electrodes to be transferred through said conductors into said insulation therebetween thereby softening the same to effect penetration of the conductors into the softened insulation until said conductors are in electrical engagement; and
   (c) welding control means responsive to the electrical engagement of said conductors for causing welding current to pass through said electrodes and conductors thereby welding the latter together;
   (d) said welding control means including a relay whose actuation applies welding current to said electrodes, amplifier means normally operative to prevent actuation of said relay, and means to render said amplifier means inoperative for causing actuation of said relay when the impedance between electrodes reaches a predetermined low value.

2. Apparatus in accordance with claim 1 wherein said amplifier means has an input and said welding control means includes a signal source that applies a signal to the input of said amplifier means for causing the latter to remain operative as long as the signal that appears at the input is greater than a predetermined value, and connector means for causing the value of said signal to be dependent upon the impedance between said conductors.

3. Apparatus according to claim 2 wherein said connection means includes said electrodes connected in shunt with said signal source and the input to said amplifier means.

4. Apparatus in accordance with claim 1 wherein said welding control means includes a welding transformer whose secondary is shunted by said electrodes and in whose primary is a switch for applying a pulse of current to said primary when said switch is closed, amplifier means connected in shunt across said electrodes, and a signal generator connected across said electrodes for applying a signal to said amplifier means, the latter being constructed and arranged to cause said switch to close when the level of said signal is less than a predetermined value.

5. Apparatus in accordance with claim 4 wherein the signal produced by said signal generator is time variable with a frequency sufficient to cause the impedance of said secondary to be large enough to develop a signal greater than said predetermined value when said conductors are not in electrical engagement.

References Cited

UNITED STATES PATENTS

| 2,433,827 | 1/1948 | Callender | 219—110 |
| 2,804,536 | 8/1957 | Brennen et al. | 219—110 |
| 3,418,444 | 12/1968 | Ruehlemann | 219—113 |
| 1,933,936 | 11/1933 | Schnetzer | 219—110 |
| 2,112,716 | 3/1938 | Smith | 219—110 |
| 3,155,809 | 11/1964 | Griswold | 219—86 |
| 3,263,059 | 7/1966 | Rzant | 219—91 |

RALPH F. STAUBLY, Primary Examiner

U.S. Cl. X.R.

219—56, 91, 110